United States Patent
Liu et al.

(10) Patent No.: US 9,323,762 B2
(45) Date of Patent: Apr. 26, 2016

(54) ELECTRONIC DEVICE AND INDEX MANAGING METHOD

(71) Applicant: HON HAI PRECISION INDUSTRY CO., LTD., New Taipei (TW)

(72) Inventors: Deng-Rung Liu, New Taipei (TW); Heng-Zong Tsao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 251 days.

(21) Appl. No.: 13/942,742

(22) Filed: Jul. 16, 2013

(65) Prior Publication Data

US 2014/0214851 A1     Jul. 31, 2014

(30) Foreign Application Priority Data

Jan. 30, 2013 (TW) .............................. 102103418 A

(51) Int. Cl.
  *G06F 7/00* (2006.01)
  *G06F 17/30* (2006.01)
(52) U.S. Cl.
  CPC .............................. *G06F 17/30091* (2013.01)
(58) Field of Classification Search
  CPC .............................................. G06F 17/30091
  See application file for complete search history.

(56) References Cited

U.S. PATENT DOCUMENTS

| 2005/0198068 | A1 | 9/2005 | Mukherjee et al. |
| 2006/0206516 | A1 | 9/2006 | Mason |
| 2009/0164475 | A1* | 6/2009 | Pottenger ........................ 707/10 |
| 2009/0204601 | A1 | 8/2009 | Grasset |
| 2011/0087658 | A1 | 4/2011 | Lunt et al. |
| 2012/0296920 | A1 | 11/2012 | Sahni et al. |
| 2013/0166577 | A1* | 6/2013 | Barak et al. ................... 707/754 |

FOREIGN PATENT DOCUMENTS

| CN | 101458689 A | 6/2009 |
| TW | 200943104 | 10/2009 |
| TW | 201304516 | 1/2013 |

* cited by examiner

*Primary Examiner* — Ajith Jacob
(74) *Attorney, Agent, or Firm* — Novak Druce Connolly Bove + Quigg LLP

(57) ABSTRACT

An electronic device records access records when a social network was accessed by the electronic device and operation records of operating the electronic device, acquires a first keyword from the access records and the operation records, creates an index based on the first keyword and an index item that records a relationship between the index and the corresponding files. The electronic device receives a search term from a user, creates a second keyword based on the search term, searches an index item corresponding to the second keyword from index items created by the index managing module and provides corresponding files according to the index item.

10 Claims, 4 Drawing Sheets

US 9,323,762 B2

ELECTRONIC DEVICE AND INDEX MANAGING METHOD

BACKGROUND

1. Technical Field

Embodiments of the present disclosure generally relate to index management, and more particularly to an electronic device and an index managing method of the electronic device.

2. Description of Related Art

More multi-media files, such as videos, movies, and pictures, are stored in electronic devices. However, it is difficult to find a particular file from such a number of multi-media files in an electronic device.

A find command allows for searching for the particular file. In detail, the find command allows a user to search for a file stored in the electronic device by various criteria including the file name or a date of creation or a date of modification or the type of the file, and according to the criteria selected by the user, the find command will search all storage sections or sections selected by the user in the electronic device and provides search results corresponding to the criteria. Such method is time consuming when the storage sections contain a lot of multi-media files and only provides the search results including the criteria selected by the user.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
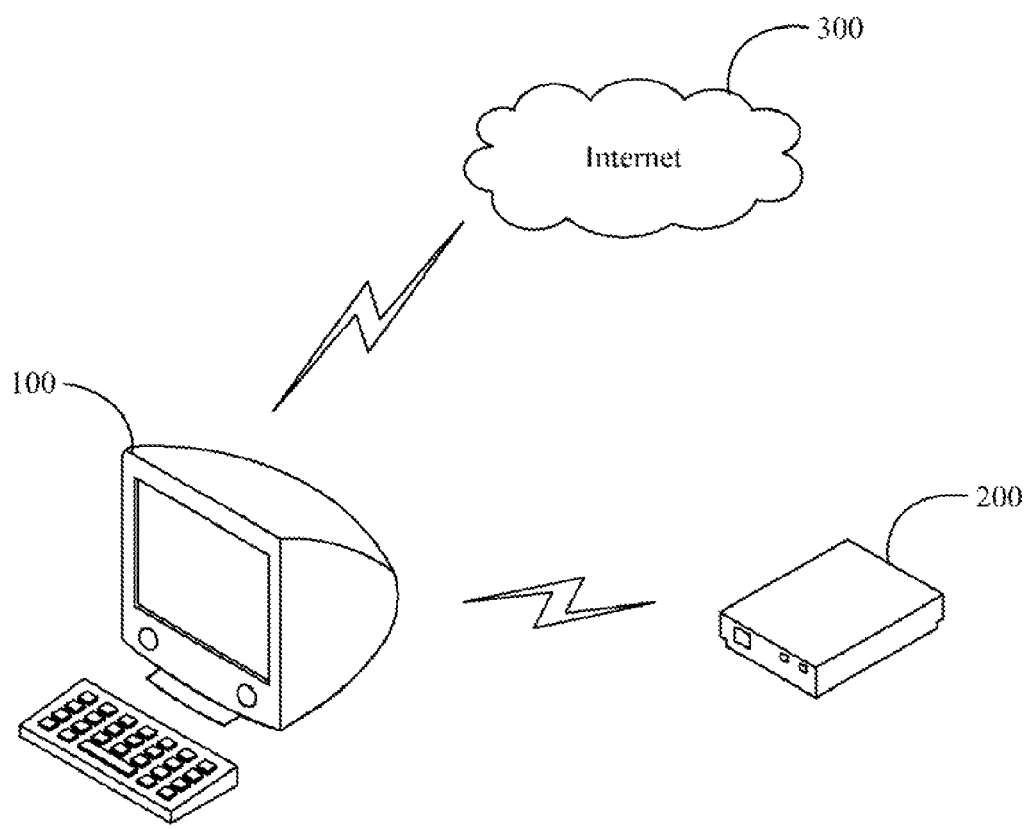
FIG. 1 is a schematic diagram of an application environment of one embodiment of an electronic device in accordance with the present disclosure.

FIG. 1 is a schematic diagram of an application environment of one embodiment of an electronic device 100 in accordance with the present disclosure. In the present embodiment, the electronic device 100 may be selected from a group including a personal computer (PC), a television (TV) and a set-top box (STB), for example. In the present embodiment, multi-media files corresponding to the electronic device 100 include files stored in a storage system of the electronic device 100 and stored in a network storage device 200 used by the electronic device 100. The electronic device 100 can access the Internet 300.

Figure 2:
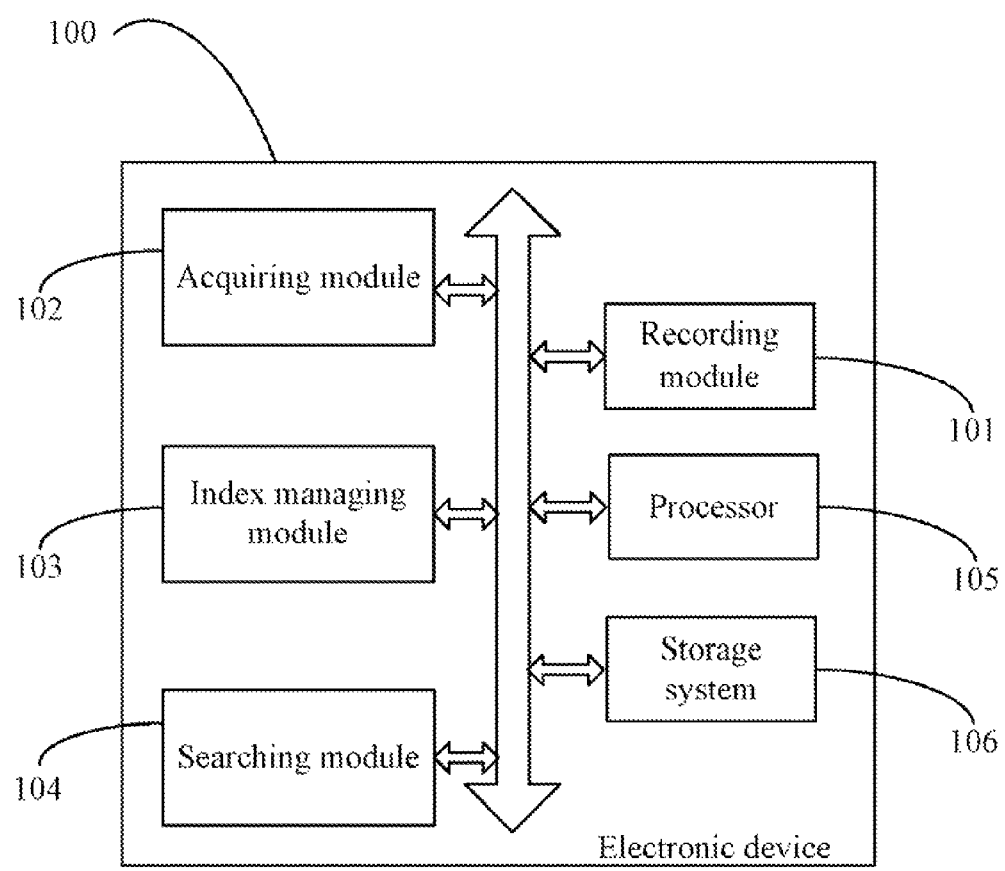
FIG. 2 is a block diagram of functional modules of the electronic device in FIG. 1.

FIG. 2 is a block diagram of functional modules of the electronic device 100 in FIG. 1. In one embodiment, the electronic device 100 includes a recording module 101, an acquiring module 102, an index managing module 103, a searching module 104, a processor 105 and a storage system 106. The modules 101-104 may include computerized code in the form of one or more programs. The one or more programs are stored in the storage system 106, and the storage system 106 is a non-transitory device. The computerized code includes instructions that are executed by the processor 105 to provide functions for the modules 101-104.

In one embodiment, the recording module 101 records access records when a social network was accessed by the electronic device 100 and operation records of operation of the electronic device 100. In the present embodiment, the access records refer to records of books, articles and pictures which are read and updated by a user on the social network. The operation records refer to records of delete, copy and remove of files in the electronic device 100. In one embodiment, the storage system 106 can store the multi-media files corresponding to the electronic device 100.

In one embodiment, the acquiring module 102 acquires a first keyword from the access records and the operation records. The index managing module 103 creates an index based on the first keyword, searches corresponding files according to the index from files corresponding to the electronic device 100, and creates an index item that records a relationship between the index and the corresponding files. The searching module 104 receives a search term from the user, creates a second keyword based on the search term, searches an index item corresponding to the second keyword from index items created by the index managing module 103 and provides corresponding files according to the index item.

In one embodiment, the recording module 101 records a frequency that a file is read on the social network.

In one embodiment, when the acquiring module 102 acquires a plurality of first keywords from the records made by the recording module 101, the index managing module 103 creates a plurality of indexes based on the plurality of first keywords, and searches corresponding files according to the plurality of indexes from files corresponding to the electronic device respectively and creates index items corresponding to the plurality of indexes respectively.

In one embodiment, the index managing module 103 creates a corresponding relationship among the index items, and when the second keyword corresponds to a part of the index items, the searching module 104 provides corresponding files according to the index items.

In one embodiment, when the acquiring module 102 acquires a plurality of first keywords and the index items are created according to a part of the plurality of first keywords, the index managing module 103 creates other index items according to the other part of the plurality of first keywords and updates the corresponding relationship among the index items and the other index items.

When the user wants to search for a particular file corresponding to the electronic device 100 and inputs a search term, the electronic device 100 may provide files including the search term and files that does not include the search term but relate to the search term. The present disclosure can avoid searching all files stored in the electronic device 100, and offers more detailed files according to the search term input by the user.

The following takes an example to introduce the invention in detail.

When the user logins in the social network by the electronic device 100 and shares an article in the social network, where the article is named as "Stone opens a silver shop" and has been read over 100 times. The recording module 101 can record frequency of a file uploaded in the social network and the frequency refers to a number of times that the file is read within a specified period. If the article has been read over a predefined frequency, such as 100 times, the recording module 101 records access records of the article and sends the access records to the acquiring module 102. The access records include the name, website, uploading date of the article.

The acquiring module 102 acquires first keywords as Stone, open, silver from the access records. The acquiring module 102 sends the first keywords to the index managing module 103. The index managing module 103 creates indexes based on the first keywords, such as an index Stone, an index silver and an index open. The following takes the index silver as an example to introduce how to create an index item of silver.

The index managing module 103 searches corresponding files according to the index silver from files corresponding to the electronic device 100, and creates the index item of silver that records a relationship between the index silver and the corresponding files. If the user wants to access some information about silver stored in the electronic device 100, the user can enter a search term as silver and the electronic device 100 provides all the files corresponding to the silver according to the index item of silver quickly. As creating the index item of silver, the electronic device 100 creates an index item of Stone and an index item of open respectively. When the electronic device 100 has created the index item of silver, the index item of Stone and the index item of open, the electronic device 100 creates a corresponding relationship among the three index items. If the user accesses one of the three index items, the electronic device 100 provides files corresponding to the one of the three index items and files corresponding to the other two of the three index items. In one embodiment, files corresponding to the index items include the name, website, uploading date of the files.

When the acquiring module 102 acquires first keywords as Stone, close, gold from access records in the next time, because the index managing module 103 has created the index item of Stone, the index managing module 103 only creates index items of close and gold respectively. The index managing module 103 further creates a corresponding relationship among the index items of Stone, close and gold. If the user accesses the index item of Stone, the electronic device 100 provides files corresponding to the index item of Stone, silver, open, close and gold to the user at the same time.

In one embodiment, if the user operates files corresponding to the electronic device 100, such as deleting some files and removing files from one disk to another, the electronic device 100 will records the operation records of operating the electronic device 100 and creating index items according to the operation records by the method mentioned above.

Figure 3:
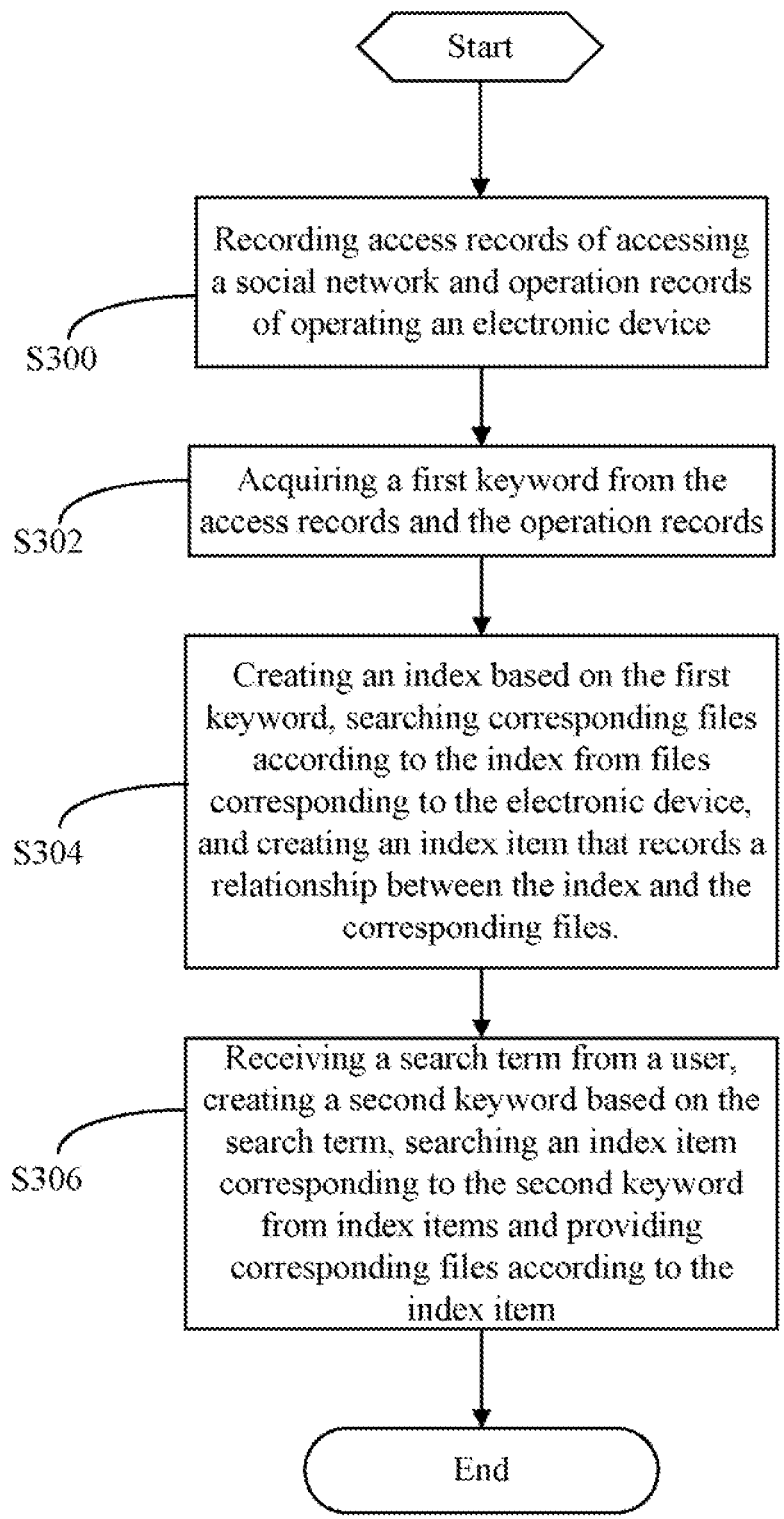
FIG. 3 is a flowchart of one embodiment of an index managing method of an electronic device.

FIG. 3 is a flowchart of one embodiment of an index managing method of the electronic device 100. In one embodiment, the method functions in the application environment in FIG. 1 and by the modules in FIG. 2 in the manner following.

In block S300, the recording module 101 records access records of accessing a social network and operation records of operating the electronic device 100.

In block S302, the acquiring module 102 acquires a first keyword from the access records and the operation records.

In block S304, the index managing module 103 creates an index based on the first keyword, searches corresponding files according to the index from files corresponding to the electronic device 100, and creates an index item that records a relationship between the index and the corresponding files.

In block S306, the searching module 104 receives a search term from the user, creates a second keyword based on the search term, searches an index item corresponding to the second keyword from index items created by the index managing module 103 and provides corresponding files according to the index item.

In one embodiment, the recording module 101 records frequency that a file is read on the social network.

In one embodiment, the files corresponding to the electronic device 100 comprise files stored in a storage system of the electronic device 100 and in a network storage device 200 used by the electronic device 100.

Figure 4:
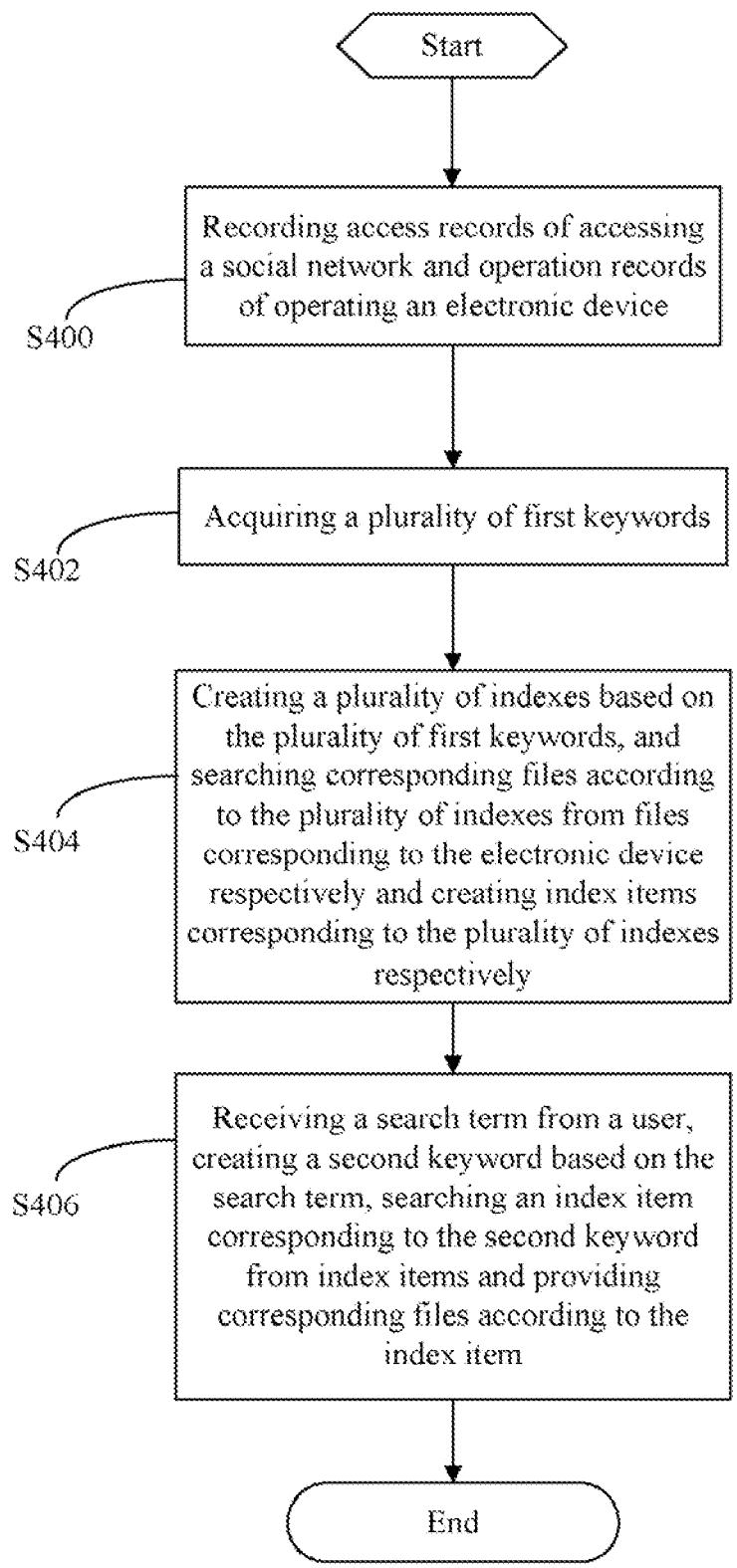
FIG. 4 is a flowchart of another embodiment of an index managing method of an electronic device.

FIG. 4 is a flowchart of another embodiment of a method for a managing index in the electronic device 100. FIG. 4 differs from FIG. 3 in block S402 and S404.

In block S402, the acquiring module 102 acquires a plurality of first keywords.

In block S404, the index managing module 103 creates a plurality of indexes based on the plurality of first keywords, and searches corresponding files according to the plurality of indexes from files corresponding to the electronic device 100 respectively and creates index items corresponding to the plurality of indexes respectively.

In one embodiment, the index managing module 103 creates a corresponding relationship among the index items, and when the second keyword corresponds to a part of the index items, the searching module 104 provides corresponding files according to the index items.

In one embodiment, when the acquiring module 102 acquires a plurality of first keywords and the index items are created according to a part of the plurality of first keywords, the index managing module 103 creates other index items according to the other part of the plurality of first keywords in block S404 and updates the corresponding relationship among the index items and the other index items.

The electronic device 100 can create index items automatically according to the access records and operation records, and provides a user detailed and related files quickly.

What is claimed is:

1. An electronic device, comprising:
   at least one processor;
   a storage system;
   one or more programs that are stored in the storage system and are executed by the at least one processor to perform a method, the method comprising:
   recording access records when a social network was accessed by the electronic device and operation records of operation of the electronic device;
   acquiring a first keyword from the access records and the operation records;
   creating an index based on the first keyword, searching corresponding files according to the index from files corresponding to the electronic device, and creating an index item that records a relationship between the index and the corresponding files; and
   receiving a search term from a user, creating a second keyword based on the search term, searching an index item corresponding to the second keyword from index items created by the creating index step and providing corresponding files according to the index item;

wherein the step of recording access records when a social network was accessed by the electronic device comprises:
recording frequency of a file uploaded in the social network, wherein the frequency refers to a number of times that the file is read within a specified period;
recording access records of the file while the file has been read over a predefined frequency;
wherein the step of acquiring a first keyword from the access records comprises:
receiving access records of the file while the file has been read over the predefined frequency.

2. The electronic device as claimed in claim 1, wherein the files corresponding to the electronic device comprise files stored in the storage system and stored in a network storage device used by the electronic device.

3. The electronic device as claimed in claim 1, wherein when the acquiring first keyword step acquires a plurality of first keywords, the creating index step creates a plurality of indexes based on the plurality of first keywords, and searches corresponding files according to the plurality of indexes from files corresponding to the electronic device respectively and creates index items corresponding to the plurality of indexes respectively.

4. The electronic device as claimed in claim 3, wherein the creating index step creates a corresponding relationship among the index items, and when the second keyword corresponds to a part of the index items, the searching index item step provides corresponding files according to the index items.

5. The electronic device as claimed in claim 4, wherein when the acquiring first keyword step acquires the plurality of first keywords and the index items are created according to a part of the plurality of first keywords, the creating index step creates other index items according to the other part of the plurality of first keywords and updates the corresponding relationship among the index items and the other index items.

6. An index managing method of an electronic device, comprising:
recording access records of accessing a social network and operation records of operating the electronic device;
acquiring a first keyword from the access records and the operation records;
creating an index based on the first keyword, searching for corresponding files according to the index from files corresponding to the electronic device, and creating an index item that records a relationship between the index and the corresponding files; and
receiving a search term from a user, creating a second keyword based on the search term, searching an index item corresponding to the second keyword from index items created by the creating index step and providing corresponding files according to the index item;
wherein the step of recording access records when a social network was accessed by the electronic device comprises:
recording frequency of a file uploaded in the social network, wherein the frequency refers to a number of times that the file is read within a specified period;
recording access records of the file while the file has been read over a predefined frequency;
wherein the step of acquiring a first keyword from the access records comprises:
receiving access records of the file while the file has been read over the predefined frequency.

7. The method as claimed in claim 6, wherein the files corresponding to the electronic device comprise files stored in a storage system and in a network storage device used by the electronic device.

8. The method as claimed in claim 6, wherein creating an index based on the first keyword, searching for corresponding files according to the index from files corresponding to the electronic device, and creating an index item that records a relationship between the index and the corresponding files further comprises:
when acquiring a plurality of first keywords, creating a plurality of indexes based on the plurality of first keywords, and searching for corresponding files according to the plurality of indexes from files corresponding to the electronic device respectively and creating index items corresponding to the plurality of indexes respectively.

9. The method as claimed in claim 8, wherein creating the index items further comprises:
creating a corresponding relationship among the index items, and when the second keyword corresponds to part of the index items, providing corresponding files according to the index items.

10. The method as claimed in claim 8, wherein when acquiring the plurality of first keywords and the index items are created according to part of the plurality of first keywords, creates other index items according to the other part of the plurality of first keywords and updates the corresponding relationship among the index items and the other index items.

* * * * *